United States Patent
Marcu et al.

(10) Patent No.: US 9,514,057 B2
(45) Date of Patent: Dec. 6, 2016

(54) STORAGE MODULE AND METHOD FOR MANAGING LOGICAL-TO-PHYSICAL ADDRESS MAPPING

(71) Applicant: SanDisk Technologies Inc., Plano, TX (US)

(72) Inventors: Alon Marcu, Tel Mond (IL); Hadas Oshinsky, Kfar Saba (IL); Amir Shaharabany, Kochav Yair (IL); Eran Sharon, Rishon Lezion (IL)

(73) Assignee: SanDisk Technologies LLC, Plano, TX (US)

( * ) Notice: Subject to any disclaimer, the term of this patent is extended or adjusted under 35 U.S.C. 154(b) by 121 days.

(21) Appl. No.: 14/096,965

(22) Filed: Dec. 4, 2013

(65) Prior Publication Data

US 2015/0154118 A1    Jun. 4, 2015

(51) Int. Cl.
*G06F 12/02* (2006.01)
*G06F 12/10* (2016.01)

(52) U.S. Cl.
CPC ....... *G06F 12/1009* (2013.01); *G06F 12/0246* (2013.01); *G06F 2212/401* (2013.01); *G06F 2212/657* (2013.01); *G06F 2212/7201* (2013.01)

(58) Field of Classification Search
CPC .......... G06F 12/0246; G06F 12/1009; G06F 2212/401; G06F 2212/657; G06F 2212/7201
See application file for complete search history.

(56) References Cited

U.S. PATENT DOCUMENTS

| | | | |
|---|---|---|---|
| 2011/0022819 A1* | 1/2011 | Post et al. | ...... 711/207 |
| 2011/0119455 A1 | 5/2011 | Tsai et al. | |
| 2012/0290798 A1 | 11/2012 | Huang et al. | |

OTHER PUBLICATIONS

Park et al., "zFTL: Power-Efficient Data Compression Support for NAND Flash-Based Consumer Electronics Devices", *IEEE Transactions on Consumer Electronics*, vol. 57, No. 3, Aug. 1, 2011, 9 pages.
International Search Report and Written Opinion for PCT/US2014/058292 dated Jan. 8, 2015, 11 pages.

* cited by examiner

*Primary Examiner* — Yong Choe
(74) *Attorney, Agent, or Firm* — Brinks Gilson & Lione (57) ABSTRACT

A storage module and method for managing logical-to-physical address mapping are disclosed. In one embodiment, a storage module is provided comprising a memory having a plurality of wordlines and a controller. The controller is configured to use a logical-to-physical address map to convert a logical address to a physical address of a wordline. A plurality of logical addresses in the map point to a single wordline, and the single wordline contains both data associated with the plurality of logical addresses and information about where to find each of the plurality of logical addresses in the single wordline . Storing the information about where to find each of the plurality of logical addresses in the wordline itself avoids the delay and complexity of using a larger logical-to-physical address map or multiple maps.

36 Claims, 8 Drawing Sheets

| | L2P Table | | |
|---|---|---|---|
| | WL # | Offset | Length |
| LBA 1 | 400 | 45 | 512 |
| LBA 2 | 730 | 0 | 4K |
| LBA 3 | 1000 | 0 | 256 |
| LBA 4 | . | . | . |
| ... | ... | ... | ... |
| LBA n-1 | . | . | . |
| LBA n | . | . | . |

STORAGE MODULE AND METHOD FOR MANAGING LOGICAL-TO-PHYSICAL ADDRESS MAPPING

BACKGROUND

In order to manage data stored in a flash memory, a table, known as a logical-to-physical address map, is used to map logical block addresses (LBAs) to physical addresses in the memory. As memory capacity increases and as the reading resolution becomes finer, logical-to-physical address maps may grow larger. In some cases, the resolution of the addresses remains the same (e.g., 4 KB) even as the memory capacity increases. In some cases, it may be possible to read the memory in a finer resolution (e.g., 1 KB). In some cases, both memory capacity increases and finer resolution are implemented. In all of these cases, the size of the logical-to-physical address map grows larger and larger.

As the size of the logical-to-physical address map grows larger, it can become impractical to store the logical-to-physical address map in RAM. Therefore, large portions of the logical-to-physical address map are stored in the flash memory, and relevant portions of the map are transferred from the flash into the RAM as requested flash controller as part of flash management. Reading from the flash memory is time consuming. Therefore, it is desired to define the logical-to-physical address maps for minimizing delay in locating the physical address associated with a given logical address.

Some storage modules use a compression engine to compress data before storing it in memory. If the compression is implemented between the logical space and the physical space (i.e., the LBAs are not compressed, but data stored in the flash is), then several LBAs are stored in a memory area. Larger or additional logical-to-physical address maps can be used to address this situation. However, using larger or additional logical-to-physical address maps can add complexity and delay to the system.

Overview

Embodiments of the present invention are defined by the claims, and nothing in this section should be taken as a limitation on those claims.

By way of introduction, the below embodiments relate to a storage module and method for managing logical-to-physical address mapping. In one embodiment, a storage module is provided comprising a memory having a plurality of wordlines and a controller. The controller is configured to use a logical-to-physical address map to convert a logical address to a physical address of a wordline. A plurality of logical addresses in the map point to a single wordline, and the single wordline contains both data associated with the plurality of logical addresses and information about where to find each of the plurality of logical addresses in the single wordline. Storing the information about where to find each of the plurality of logical addresses in the wordline itself avoids the delay and complexity of using a larger logical-to-physical address map or multiple maps.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned above, using large or multiple logical-to-physical address maps can add complexity and delay to a storage module. Such is the case, for example, when a compression engine is used to compress data before storing it in memory, and the compression is implemented between the logical space and the physical space. In this situation, several logical block addresses (LBAs) are stored in a given wordline. The following embodiments can be used to map logical to physical addresses in this type of situation without using larger or additional logical-to-physical address maps. Before turning to these and other embodiments, the following paragraphs provide a discussion of an exemplary storage module that can be used with these embodiments. Of course, these are just examples, and other suitable types of storage modules can be used.

Figure 1:
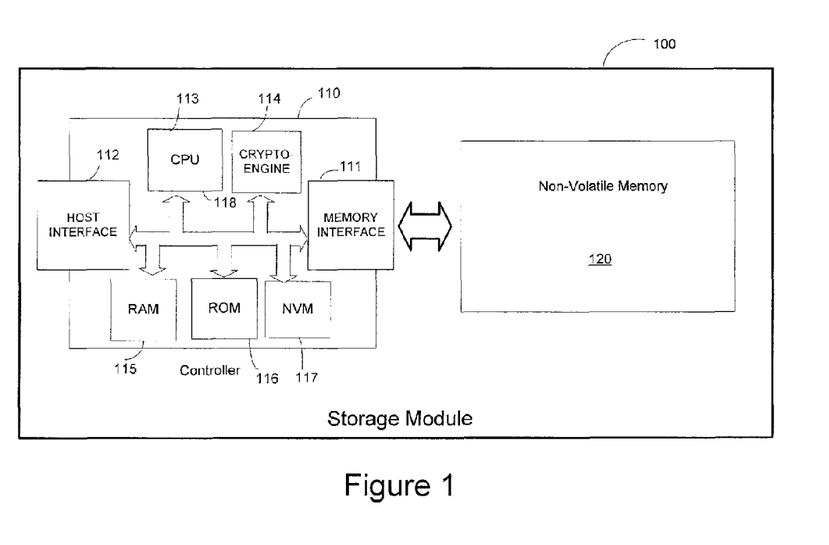
FIG. 1 is a block diagram of an exemplary storage module of an embodiment.

As illustrated in FIG. 1, a storage module 100 of one embodiment comprises a controller 110 and non-volatile memory 120. The controller 110 comprises a memory interface 111 for interfacing with the non-volatile memory 120 and a host interface 112 for placing the storage module 100 operatively in communication with a host controller. As used herein, the phrase "operatively in communication with" could mean directly in communication with or indirectly in communication with through one or more components, which may or may not be shown or described herein.

Figure 2A:
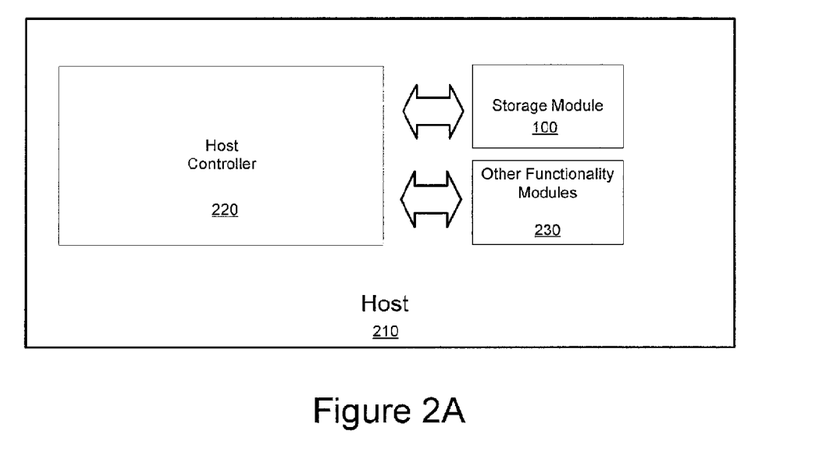
FIG. 2A is a block diagram of an electronic device of an embodiment, where the exemplary storage module of FIG. 1 is embedded in the electronic device.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation. The host controller 220 can interface with the embedded storage module 100 using, for example, an eMMC host interface or a UFS interface. The host 210 can take any form, such as, but not limited to, a solid state drive (SSD), a hybrid storage device (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
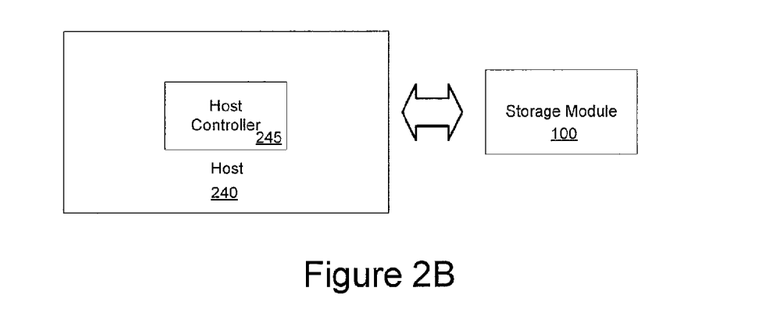
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the controller 110, and also conveys memory responses from the controller 110 to the host controller 220 (FIG. 2A) or host 240 (FIG. 2B). Also, it should be noted that when the storage module 110 is embedded in the host 210, some or all of the functions described herein as being performed by the controller 110 in the storage module 100 can instead be performed by the host controller 220.

Returning to FIG. 1, the controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. Also, some of the components shown as being internal to the controller 110 can also be stored external to the controller 110, and other component can be used. For example, the RAM 115 (or an additional RAM unit) can be located outside of the controller die and used as a page buffer for data read from and/or to be written to the memory 120.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed.

The storage module 100 of FIG. 1 can be used in embodiments for managing logical-to-physical address mapping in which a wordline stores internal addresses of the various logical addresses in the wordline (i.e., information about where to find each of the plurality of logical addresses in the wordline). As mentioned above, in order to manage data stored in a flash memory, a table (or set of tables) known as a logical-to-physical address map is maintained (the terms "map" and "table" will be used interchangeably herein). The table(s) hold a mapping of the logical addresses to physical addresses in the flash memory 120. (The map can be stored in the memory 120, ROM, 116, or non-volatile memory 117, and then read into the RAM 115 as needed. Alternatively, the map can be generated on-the-fly.) In the logical address universe, the basic unit is a logical block address (LBA), whereas in the physical world, the basic unit is usually a wordline (WL). For simplicity and without restricting any aspect of the invention, in the following embodiment, the size of an LBA is equal to the size of a physical wordline. After this simplified embodiment is described, a more-generalized embodiment will be discussed. However, the general concept of storing information about where to find each of the plurality of logical addresses n a wordline to avoid the delay and complexity of using a larger logical-to-physical address map or multiple maps is applicable to both embodiments.

Figure 3:
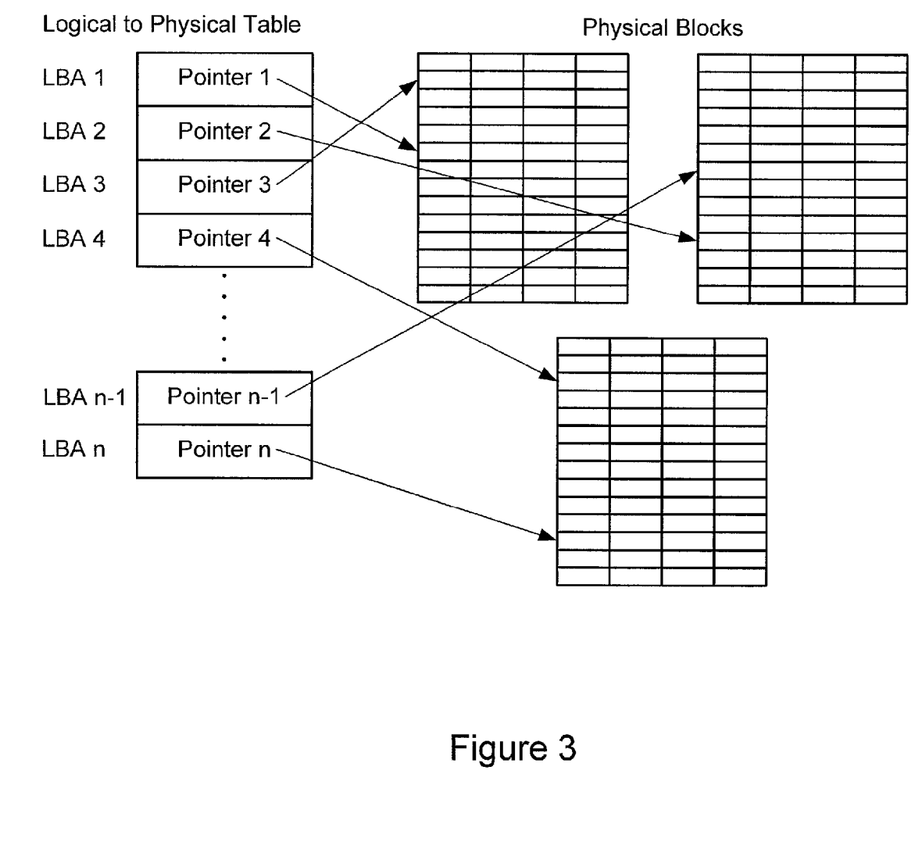
FIG. 3 is an illustration of a logical-to-physical address map in which each logical block address in the map points to a unique physical block in memory.

FIG. 3 illustrates a logical-to-physical address table map. Typically, for each LBA, there will be an entry in the logical-to-physical address map that points to a physical address in the flash memory 120. However, many memory systems implement a compression engine, which detects if data is compressible and compresses the data before storing it into physical memory. If the compression is implemented between the logical space and the physical space (i.e., LBAs are not compressed, but data stored in the flash memory is compressed), then a mismatch is created between the logical data and the physical data. In such a case, the same physical storage space may store a much larger amount of LBAs, and the alignment between LBAs and wordlines breaks down. A single wordline may contain multiple LBAs, each of which occupies only a fraction of the wordline. This situation calls for a new scheme for storing the logical data associated with LBAs in the physical memory and a new structure for the logical-to-physical address tables.

When the data is stored in the memory in compressed form, it may happen that a single wordline will store multiple LBA data even though each of the LBAs represents one wordline's worth of uncompressed data. One approach to solve this problem is by using two logical-to-physical address tables. A primary table will contain the physical address of a wordline in which the LBA is stored, while a secondary table will contain the relative address within the wordline (i.e., an offset from the wordline head) and the length (i.e., amount of physical memory) occupied by the LBA.

Figure 4:
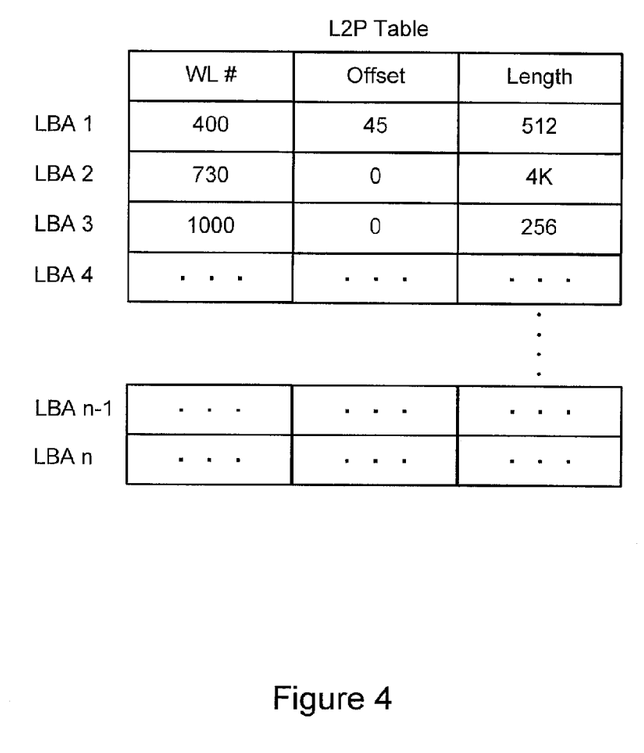
FIG. 4 is an illustration of a logical-to-physical address map in which offset and length fields are specified.

Alternatively, one logical-to-physical address table may be used, but each LBA will be associated with three values: wordline address, offset address, and length. This is illustrated in FIG. 4, with LBA1 being associated with the entries 400, 45, 512. The means that LBA1 is mapped to wordline number 400, and its associated data begins at an offset of 45 bytes and is 512 bytes long. LBA2 is a not compressed; therefore, the offset is set to 0, and the length is set to 4K, which is the full length of a wordline in this example. LBA3 is mapped to the beginning of wordline 1000, although it is compressed and its physical storage length is just 256 bytes. If no compression is used and all the units are of the same size, then the size information is not needed, and the offset becomes an index of the logical unit index inside the page.

The two approaches above address the problem to some extent, but they have their drawbacks. For example, the amount of memory for the mapping table is significantly large. This is true for both the primary and secondary table approach, as well as for the extended one-table approach. Therefore, only a smaller amount of LBAs may be stored in RAM, and larger portions of the table will be stored in the flash memory. This will increase the amount of reading from the flash memory, which is significantly slower than reading from RAM. As a result, system performance will degrade.

In one embodiment, instead of using a larger logical-to-physical address map or multiple maps to address this issue, a single logical-to-physical address map that would ordinarily be used for uncompressed data is used, and information about where data is stored within the wordline is stored in the wordline itself. This allows for fast access to compressed data items without increasing the ordinary mapping tables (used for uncompressed data) and without paying a large performance penalty.

Figure 5:
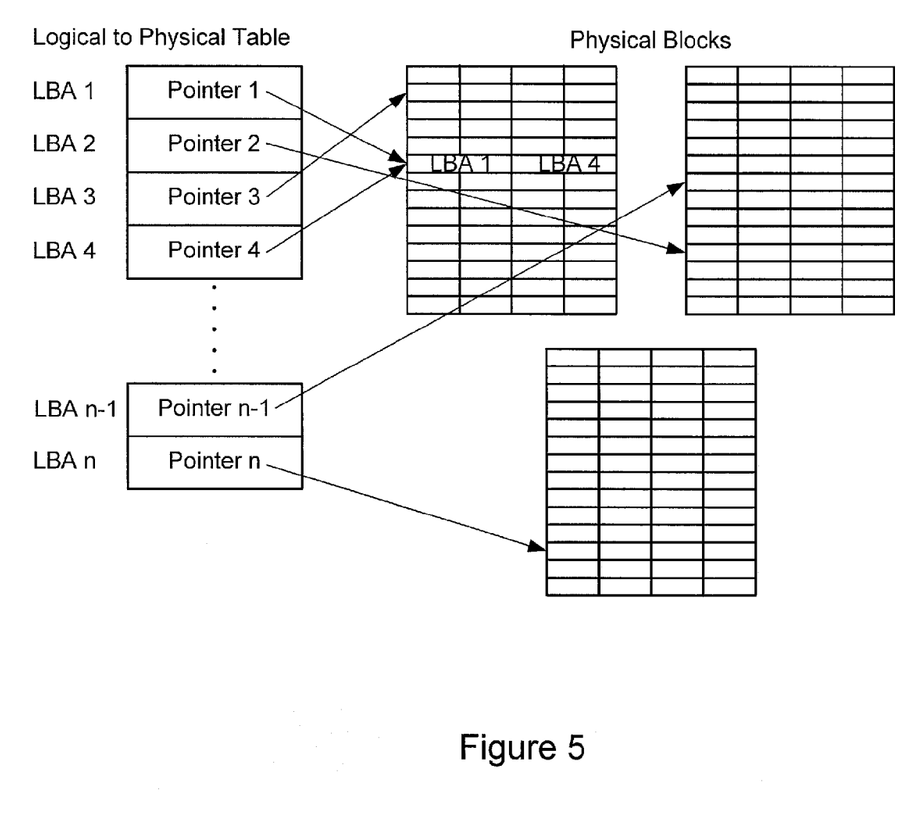
FIG. 5 is an illustration of a logical-to-physical address map of an embodiment in which a plurality of logical block addresses in the map point to the same physical block in memory.

In this embodiment, a plurality of logical addresses in the map point to a single wordline (unlike maps ordinarily used for uncompressed data, in which each logical address points to a unique wordline). That is, because two or more different LBAs may be stored in the same physical wordline when their associated data is compressed, the address of the wordline will appear multiple times in the logical-to-physical address map (one for each LBA stored in the same wordline). This is illustrated in FIG. 5, where LBA 1 and LBA 4 are stored in the same wordline.

Figure 6:
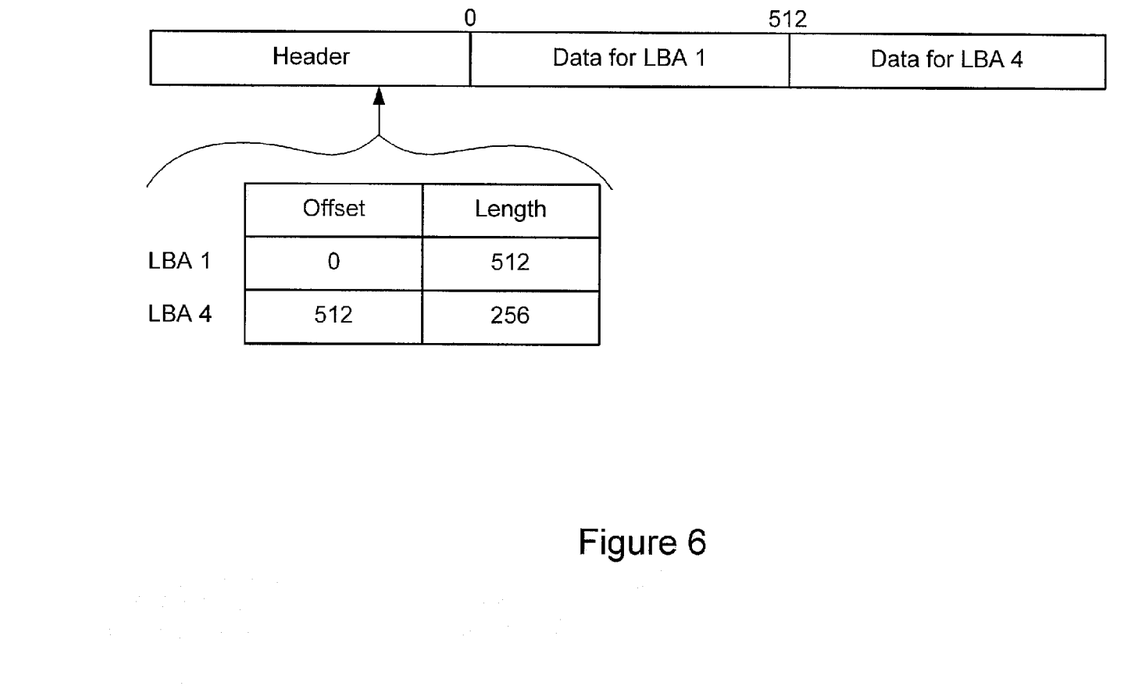
FIG. 6 is an illustration of a wordline of an embodiment.

In this embodiment, the internal address within a wordline will be stored within the wordline. That is, the wordline itself stores information about where to find each of the plurality of logical addresses in the wordline. If two different LBAs are mapped to the same wordline, (e.g., LBA 1 and LBA 4 are both mapped to the same wordline), then in the mapping table, both will point to the same physical memory address, which is the address of the beginning of the wordline. However, in addition to the data related to the different LBAs, the wordline will also store additional information about where to find each of the plurality of LBAs in the wordline. So, in FIG. 3, LBA 1 and LBA 4 point to the same wordline, which stores the data associated with each of the LBAs. The data related to LBA 1 is stored in the first half of the wordline, and the data related to LBA 4 is stored in the second half of the wordline. In order to resolve the ambiguity in the internal location, a header H can be added to the wordline such that the header holds information regarding the internal positions of both LBA 1 and LBA 4 (see FIG. 6). In some embodiments, the data stored in the memory is in compressed form. As shown in FIG. 6, the information about where to find each of the plurality of logical addresses can contain an offset and a length. The offset may be relative to the beginning of the data or an absolute offset measuring the offset from the beginning of the wordline. Other types of information can be used to find each of the plurality of logical addresses, such as, but not limited to, specific addresses within a wordline and just offset information (if a standard length is used). In some implementations, the data may be written such that there is no free space between consecutive data. In such cases, the end of a data unit may be determined from the offset of the consecutive data, and the "length" field may be omitted. Alternatively, the offset may be derived from the length, so the length may be stored and the offset may be omitted. In alternate embodiment, the information is stored in a location in the wordline other than the header.

This implementation adds only a slight delay to the process of reading from the memory 120. When data for a specific LBA is requested to be read, the flash management in the controller 110 will use the logical-to-physical address mapping table in the same way as in the conventional, non-compressed case. All the data in the specific wordline associated with the LBA will be read from the flash memory 120, similar to the non-compressed case. For example, in order to read the data, a full ECC codeword would be sensed from the flash memory 120 and decoded in order to decode any specific LBA information. It is preferred that the header and the data of the LBA that it points to reside in the same ECC block to avoid double ECC decode, which is very time-consuming operation. Thus, an effective solution means that a header and few LBAs which are pointed by this header are all packaged in the same ECC block (which might be with size of 4KB for example). (In a non-compressed situation, each LBA may be encoded independently in a codeword, and the size of each codeword may be the same as the size of a wordline. In the compressed case, each codeword will include full wordline content, including multiple LBAs and the additional information about where to find each of the LBAs within the wordline.) Therefore, even in the compressed case, the controller 110 would sense and decode a full wordline in order to read a compressed LBA. This means that the sense and decode operations are the same for a compressed system or a non-compressed system. Thus, sensing and decoding do not cause any burden on the flash management as the data is read with the same resolution as the non-compressed case. Once the data is read and decoded, it will be easy to determine the location of the requested LBA within the data read from the flash memory 120, and the data in this location will be decompressed to decode the LBA.

Figure 8:
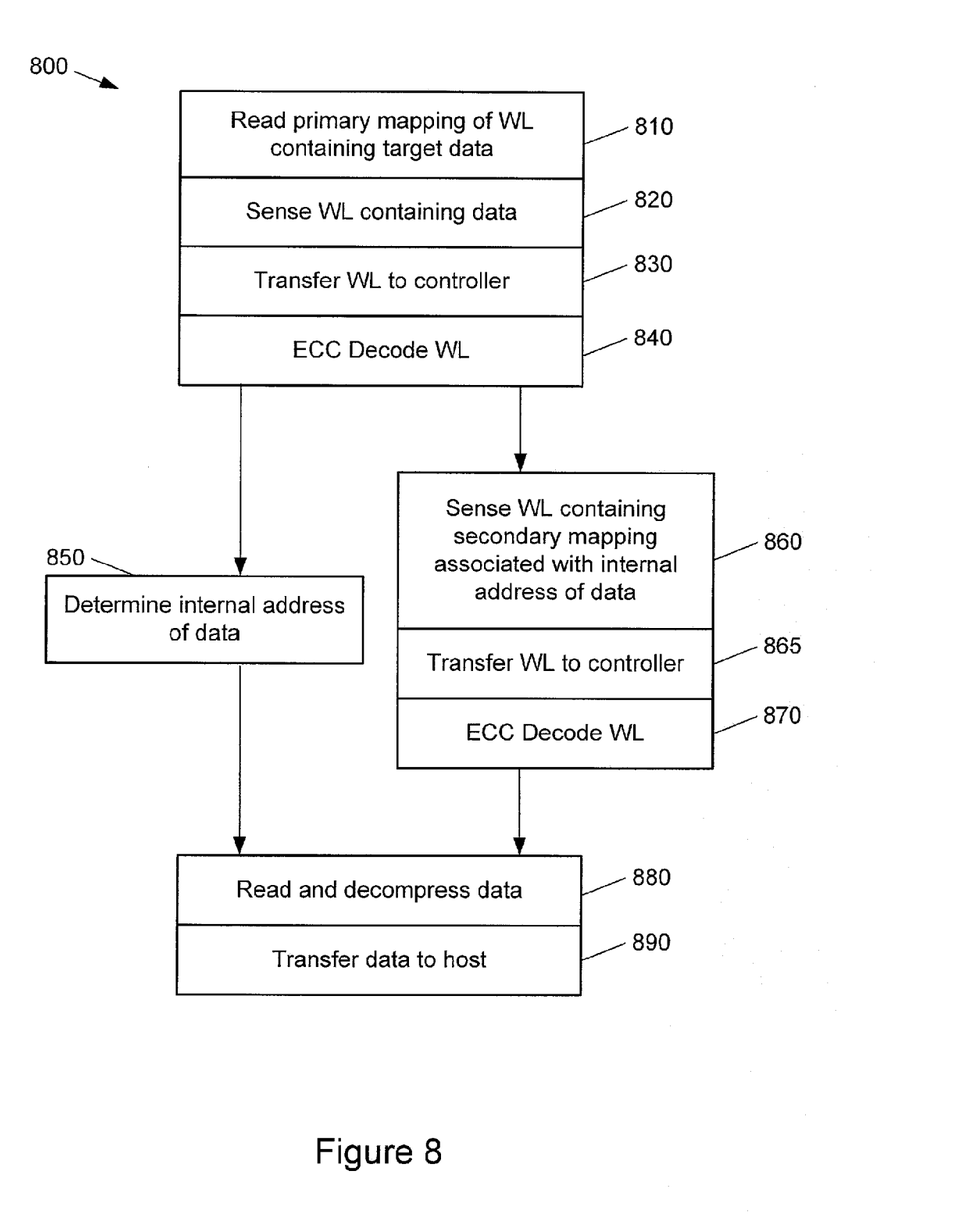
FIG. 8 is a flowchart illustrating performance advantages of an embodiment.

In this embodiment, the memory requirements of the logical-to-physical address map are the same as in the non-compressed case. Moreover, the total amount of memory (including the headers in the wordlines) is less than the amount of memory required to implement a solution based on primary and secondary mappings, or an extended table with three entries per LBA, as described above. This is due to the fact that, according to this embodiment, the header length can be dynamically set as a function of the compression. For example, if a certain wordline stores uncompressed data, then according to this embodiment, the header for that wordline may simply be a one-bit flag indicating that no compression is implemented. For a wordline containing two LBAs, the header can store offsets for the two LBAs along with an indication that two LBAs are mapped to the wordline (if the compressed LBAs are writing contiguously one after the other, only offset information is needed, and the length is calculated by the difference between two adjacent offsets or for the last chunk by the difference between the end of the 4 KB area and the last offset). In general, the header may be linear in the number of LBAs mapped to the wordline. In contrast, the other approaches mentioned above require allocation of memory for the worst case, and each LBA is allocated with memory for wordline number, offset, and length. This embodiment also has other performance advantages over a solution based on primary and secondary mappings. This is illustrated in the flow chart 800 of FIG. 8, which illustrates the process of random read of data in a system solution based on the present disclosure with random read of data in a system solution based on primary and secondary mappings. In the example, both solutions perform the first four steps 810, 820, 830, 840 in a similar manner. Namely, they both read the primary mapping of the wordline containing the target data (act 810), both sense the wordline containing the target data (act 820), transfer the wordline to the controller (act 823), and ECC-decode the wordline (act 840). (The last acts of reading and decompressing data (act 880) and transferring the data to the host (act 890) are also similar in the two approaches.) The difference between the two approaches is in determining the internal address of the target data in the wordline. According to one embodiment, the internal address is determined from the header, which was decoded as part of the wordline (act 850). Therefore, this information is readily available in the controller with no need for further sensing of the non-volatile memory. According to the solution based on primary and secondary mappings, the internal address is determined by reading it from a secondary mapping. Typically, the secondary mapping will not reside in the controller, thus it will be required to sense the non-volatile memory (act 860), transfer the wordline to the controller (act 885), and ECC-decode the secondary mapping (act 870). Thus, the process of random read is significantly faster in a solution based on the present embodiment.

FIG. 5 illustrated a case where only one wordline contained compressed data. In practice, many wordlines may contain compressed data, and the compression rate may vary significantly from one data to another. For example, some of the data may experience a compression of 90% or more, such that 10 LBAs may point to the same physical memory unit, while other LBAs will compress to approximately 50%, such that no more than two LBAs of this type may point to the same physical memory.

Another aspect of this embodiment relates to storing data of various compression rates in the physical memory. In one embodiment, compressed data is stored in the physical memory in such a way that data stored in the same physical memory unit (e.g., same wordline) will be of similar compression rates. For example, if data with a compression rate of 90% is stored in a specific physical memory unit, then other data will be stored in the same memory unit only if their compression rate is at least 70%. Therefore, data with a compression ratio of 50% will not be stored in the same memory unit as the data with 90% compression. In some cases, this may degrade the compression rates of the system, but, in general, this embodiment will help with memory management.

In an alternate embodiment, instead of maintaining a counter of the explicit size of each compressed logical unit (e.g., in order to maintain the amount of valid/invalid data in each block), it is sufficient to count the amount of valid logical units in each physical block. A counter of the number of valid logical units per physical block may already exist in an implementation without compression. Thus, there is no need to add any extra logic on this part (less complexity). For example, in a flash memory system, a process of garbage collection takes place where old data is designated as invalid and new data is written to different location in the flash memory. A storage module operating according to the present embodiment will be able to predict the amount of invalid physical memory addresses at any given time by keeping track of the updates of the LBAs. If a certain LBA was invalidated, then the amount of memory that became obsolete due to this operation will be estimated as a function of the number of LBAs that are associated with the physical memory unit it was stored in. If the physical memory unit stored only two LBAs, the amount of obsolete memory from an invalidation of one of the LBAs will be estimated at a half of the memory unit. If the memory unit stored 10 LBAs (the data associated with 10 LBAs), then the amount of obsolete memory due to invalidation of one LBA will be estimated at $\frac{1}{10}$ of the memory unit. This balanced approach to storing compressed data will enable better flash management.

Also, the efficiency of storage of logical units into physical units improves because less padding is used. For example, consider a situation where a physical unit is filled $\frac{2}{3}$ with small compressible logical units, and then a logical unit which is only half compressible is received. If logical units are mapped together according to time of arrival from a host, the current physical unit will have to be padded by $\frac{1}{3}$ zeros and closed. The half-compressible data will be mapped to a new physical unit. According to one embodiment, the half-compressible data is not a candidate to be stored with the multiple compressible logical data units, thus the physical unit containing the $\frac{2}{3}$ compressible logical units will not close and will remain open for the next compressible logical data unit.

Figure 7:
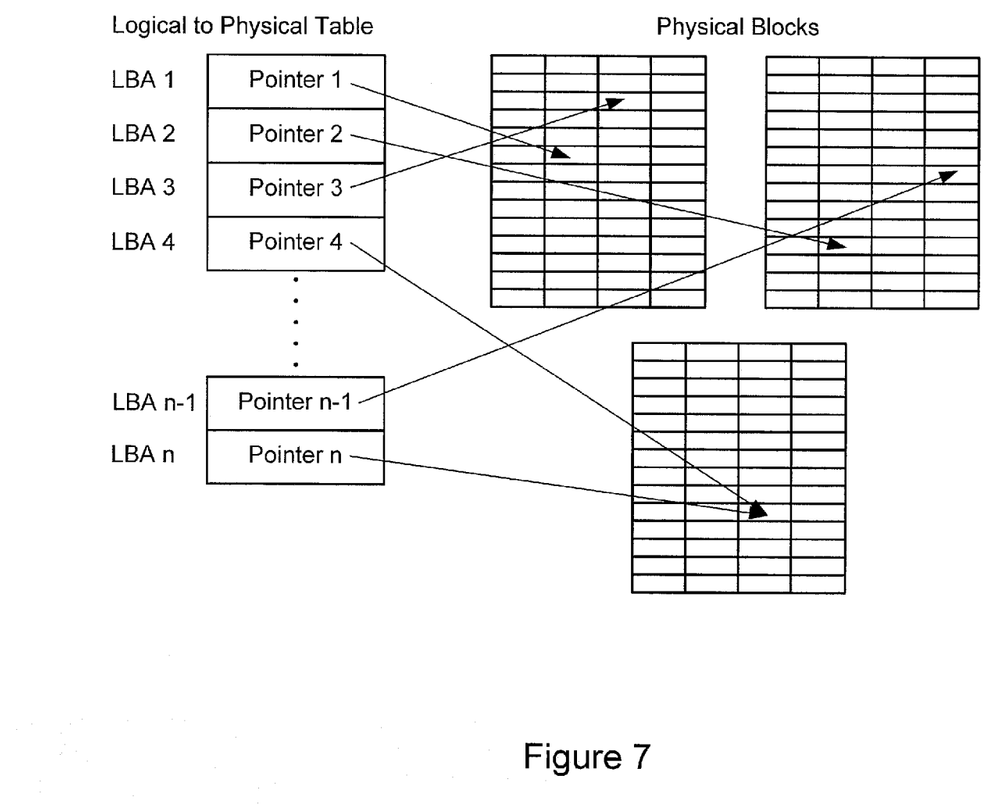
FIG. 7 is an illustration of a logical-to-physical address map in which each logical block address in the map points to a unique physical page in the memory and an additional offset inside the page.

There are many other alternative that can be used with these embodiments. For example, as mentioned above, in the preceding examples, the basic units of the logical space before compression were the same size as the basic units in the physical space. However, in principle and in practice, the resolutions may differ from logical to physical in the uncompressed case, such that the sizes of the wordlines and LBAs are not aligned prior to compression. (Before compression, several LBA's are stored in a given wordline because one wordline contains several pages. The compression is just increasing the amount of LBA's that will be stored in the same wordline (or page). Using legacy mapping formats will increase the mapping table since a larger index is needed to map more LBA's in the same page.) For example, in some situations, each LBA is a single sector, whose size is 0.5 KB, whereas the size of each wordline is 16 KB. Each wordline may be partitioned to smaller units, such as 4 KB units. As shown in FIG. 7, in this case, LBAs will be grouped in sets of eight, and the mapping table will point to the given 4 KB unit that contains that respective LBA. Each logical block address in the map points to a unique physical page in the memory and an additional offset inside the pageAs flash memories become larger in capacity and as the reading resolution becomes finer, the logical-to-physical address map may grow larger. In some cases, the resolution of the addresses remains the same (e.g., 4 KB), but the capacity of the flash memory 120 increases. In other cases, it is desired to be able to read the flash memory 120 in a finer resolution, so the basic unit may be reduced (e.g., to 1 KB). In other cases both the capacity increases and a finer resolution is implemented. Also, as in the above example, compression can be used to also increase the resolution. In all of these cases, the logical-to-physical address map grows larger and larger. By using these embodiments, information about the location in a wordline for a given LBA is stored in the wordline itself, avoiding the need for more complex or additional mapping tables.

Other variations are also possible. For example, in some cases, the compressed data may be data that is compressed as stand-alone data. In other cases, the data may not be compressed as a stand-alone data, but its content is a pattern that is used repeatedly by the memory. In the latter case, the pattern may be stored somewhere in the system, (RAM 115, ROM 116, or main storage 120), and the compressed LBA will be a pointer to the pattern's address. In other cases, the compressed data may be a combination of data that is compressible as stand-alone data and data that represents frequently-used patterns that are not compressible as stand-alone data (or that achieve a better compression ratio when considered as a pattern). Thus, the physical storage can hold either pointers to patterns or compressed data from logical units. Preferably, when the compressed data is a combination of data that is compressible as stand-alone data and data that represents frequently-used patterns, an additional flag may be used to determine which data represents a pattern and which is stand-alone compressed data. In some embodiments, it may be preferred to store frequently-used patterns in separate blocks since their compression ratio is usually very large, thus they can be compressed very efficiently. In one embodiment, it is desired to store data together according to their compression ratio.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
   a memory comprising a plurality of wordlines; and
   a controller configured to:
   receive, from a host, first data identified by a first logical address and second data identified by a second logical address, wherein a size of the first and second data is larger than a size of a wordline in the memory;
   compress the first and second data, wherein, after being compressed, the first and second data are sized to both be stored in the wordline;
   store the compressed first and second data in the wordline, wherein the wordline is identified by a physical address;
   store information in the wordline that indicates where each of the compressed first and second data is stored in the wordline; and
   update a logical-to-physical address map to indicate that both the first and second logical addresses point to a physical address of the wordline, wherein, after being updated, the logical-to-physical address map indicates which wordline contains the compressed first and second data, as identified by the first and second logical addresses, but not where in the wordline the first or second data is stored.

2. The storage module of claim 1, wherein additional wordlines in the memory also contain compressed data, and wherein a compression rate varies between wordlines.

3. The storage module of claim 2, wherein all data stored in a given wordline has a same compression rate.

4. The storage module of claim 1, wherein the information that indicates where the compressed first and second data is stored in the wordline is stored in a header of the wordline.

5. The storage module of claim 4, wherein a size of the header is dynamically set as a function of an amount of compression used in the wordline.

6. The storage module of claim 1, wherein the storage module is embedded in a host.

7. The storage module of claim 1, wherein the storage module is removably connected to a host.

8. The storage module of claim 1, wherein the memory is a NAND memory.

9. The storage module of claim 1, wherein the storage module is a solid-state drive.

10. The storage module of claim 1, wherein the logical-to-physical address map is stored in the memory, and wherein at least part of the logical-to-physical address map is temporarily cached in random access memory in the controller.

11. The storage module of claim 1, wherein the information that indicates where the compressed first and second data is stored in the wordline comprises an offset and a length.

12. A storage module comprising:
    a memory comprising a plurality of wordlines; and
    a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
    wherein the controller is further configured to generate an error correction code of a codeword comprising the data associated with the plurality of logical addresses and the information about where to find each of the plurality of logical addresses.

13. A storage module comprising:
    a memory comprising a plurality of wordlines; and
    a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
    wherein the controller is further configured to perform the following:
    in response to a command to read one of the plurality of logical addresses, read an entirety of the single wordline before using the information about where to find each of the plurality of logical addresses to find the one of the plurality of logical addresses.

14. The storage module of claim 13, wherein the data stored in the single wordline is compressed.

15. A storage module comprising:
    a memory comprising a plurality of wordlines; and
    a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
    wherein the controller is further configured to predict an amount of invalid memory addresses in the single wordline by tracking updates to the plurality of logical block addresses.

16. A storage module comprising:
    a memory comprising a plurality of wordlines; and
    a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
wherein the data is a pointer to another address which holds a pattern of data repeatedly used in the memory.

17. A storage module comprising:
a memory comprising a plurality of wordlines; and
a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
wherein there is a 1:1 relationship between wordlines and logical addresses, and wherein compression causes the plurality of logical addresses to point to the single wordline.

18. A storage module comprising:
a memory comprising a plurality of wordlines; and
a controller configured to use a logical-to-physical address map to convert a logical address to a physical address of a wordline, wherein a plurality of logical addresses in the map point to a single wordline, and wherein the single wordline contains both data associated with the plurality of logical addresses and information about where to find each of the plurality of logical addresses in the single wordline;
wherein there is a N:1 relationship between wordlines and logical addresses prior to compression, wherein N is a number greater than 1, and wherein the plurality of logical addresses point to a same offset region in the single wordline.

19. A method for managing logical-to-physical address mapping, the method comprising:
performing the following in a storage device having a memory comprising a plurality of wordlines and a logical-to-physical address map:
receiving, from a host, a read request containing a first logical address;
converting the first logical address to a physical address of a wordline using the logical-to-physical address map, wherein the logical-to-physical address map shows that both the first logical address and a second logical address point to a single wordline, wherein the single wordline contains information about where to find each of the first and second logical addresses in the single wordline;
reading the information in the single wordline to determine where data associated with the first logical address is located in the single wordline;
based on the read information, reading the data identified by the first logical address from the single wordline, wherein the data is compressed; and
decompressing the data read from the single wordline.

20. The method of claim 19, wherein the information about the where to find the first and second logical addresses is stored in a header of the single wordline.

21. The method of claim 19, wherein a size of the header is dynamically set as a function of an amount of compression used in the single wordline.

22. The method of claim 19, wherein the storage module is embedded in a host.

23. The method of claim 19, wherein the storage module is removably connected to a host.

24. The method of claim 19, wherein the memory is a NAND memory.

25. The method of claim 19, wherein the storage module is a solid-state drive.

26. The method of claim 19, wherein the logical-to-physical address map is stored in memory, and wherein at least part of the logical-to-physical address map is temporarily cached in random access memory in the controller.

27. The method of claim 19, wherein the information about where to find each of the plurality of logical addresses in the single wordline comprises an offset and a length.

28. A method for managing logical-to-physical address mapping, the method comprising:
performing the following in a storage device having a memory comprising a plurality of wordlines and a logical-to-physical address map:
converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline;
reading the information in the single wordline to determine where data associated with one of the plurality of logical addresses is located in the single wordline; and
generating an error correction code of a codeword comprising the data associated with the plurality of logical addresses and the information about where to find each of the plurality of logical addresses.

29. The method of claim 28, wherein the data stored in the single wordline is compressed.

30. The method of claim 29, wherein additional wordlines in the memory contain compressed data, and wherein a compression rate varies between wordlines.

31. The method of claim 30, wherein all data stored in a given wordline has a same compression rate.

32. A method for managing logical-to-physical address mapping, the method comprising:
performing the following in a storage device having a memory comprising a plurality of wordlines and a logical-to-physical address map:
converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline;
reading the information in the single wordline to determine where data associated with one of the plurality of logical addresses is located in the single wordline; and
in response to a command to read one of the plurality of logical addresses, reading an entirety of the single wordline before using the information about where to find each of the plurality of logical addresses to find the one of the plurality of logical addresses.

33. A method for managing logical-to-physical address mapping, the method comprising:
performing the following in a storage device having a memory comprising a plurality of wordlines and a logical-to-physical address map:

converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline;

reading the information in the single wordline to determine where data associated with one of the plurality of logical addresses is located in the single wordline; and predicting an amount of invalid memory addresses in the single wordline by tracking updates to the plurality of logical block addresses.

34. A method for managing logical-to-physical address mapping, the method comprising:

performing the following in a storage device having a memory comprising a plurality of wordlines and a logical-to-physical address map:

converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline; and reading the information in the single wordline to determine where data associated with one of the plurality of logical addresses is located in the single wordline;

wherein the data is a pointer to another address which holds a pattern of data repeatedly used in the memory.

35. A method for managing logical-to-physical address mapping, the method comprising:

performing the following in a storage device having a memory comprising a plurality of wordlines and a logical-to-physical address map:

converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline; and reading the information in the single wordline to determine where data associated with one of the plurality of logical addresses is located in the single wordline;

wherein there is a 1:1 relationship between wordlines and logical addresses, and wherein compression causes the plurality of logical addresses to point to the single wordline.

36. A method for managing logical-to-physical address mapping, the method comprising:

performing the following in a storage device having a memory comprising a plurality of wordlines and a logical-to-physical address map:

converting a logical address to a physical address of a wordline using the logical-to-physical address map, wherein a plurality of logical addresses in the map point to a single wordline, wherein the single wordline contains both data associated with the plurality of logical addresses and information about where to find each of the plurality of logical addresses in the single wordline;

reading the information in the single wordline to determine where data associated with one of the plurality of logical addresses is located in the single wordline; and wherein there is a N:1 relationship between wordlines and logical addresses prior to compression, wherein N is a number greater than 1, and wherein the plurality of logical addresses point to a same offset region in the single wordline.

\* \* \* \* \*